United States Patent
Liebermann et al.

(10) Patent No.: US 7,354,645 B2
(45) Date of Patent: *Apr. 8, 2008

(54) ENGINEERED GLASSES FOR METALLIC GLASS-COATED WIRE

(75) Inventors: Howard H. Liebermann, Succasunna, NJ (US); William C. LaCourse, Alfred, NY (US); James E. O'Keefe, Jr., Westwood, NJ (US)

(73) Assignee: Demodulation, LLC, Westwood, NJ (US)

( * ) Notice: Subject to any disclaimer, the term of this patent is extended or adjusted under 35 U.S.C. 154(b) by 118 days.

This patent is subject to a terminal disclaimer.

(21) Appl. No.: 10/746,784

(22) Filed: Dec. 26, 2003

(65) Prior Publication Data
US 2005/0158545 A1    Jul. 21, 2005

Related U.S. Application Data

(60) Provisional application No. 60/437,460, filed on Jan. 2, 2003.

(51) Int. Cl.
*B32B 15/00* (2006.01)

(52) U.S. Cl. .................. 428/379; 428/375; 428/389; 174/110 A

(58) Field of Classification Search .............. 428/375, 428/379, 389, 384; 174/110 A
See application file for complete search history.

(56) References Cited

U.S. PATENT DOCUMENTS

| | | | |
|---|---|---|---|
| 4,657,604 A * | 4/1987 | Ogasawara et al. | 148/304 |
| 4,657,605 A * | 4/1987 | Ogasawara et al. | 148/304 |
| 5,240,066 A | 8/1993 | Gorynin et al. | 164/461 |
| 5,756,998 A * | 5/1998 | Marks et al. | 250/324 |
| 6,270,591 B2 | 8/2001 | Chiriac et al. | 148/300 |
| 6,441,737 B1 * | 8/2002 | Antonenco et al. | 340/572.1 |
| 6,747,559 B2 * | 6/2004 | Antonenco et al. | 340/572.1 |
| 2001/0001397 A1 * | 5/2001 | Chiriac et al. | 148/304 |
| 2003/0085809 A1 * | 5/2003 | Antonenco et al. | 340/572.6 |
| 2005/0000599 A1 * | 1/2005 | Liebermann et al. | 148/300 |

(Continued)

FOREIGN PATENT DOCUMENTS

JP        52140627 A  * 11/1977

OTHER PUBLICATIONS

A Method of Drawing Metallic Filaments and a Discussion of Their Properties and Uses. *Phys. Rev. 23* (1924), p. 655-661.

(Continued)

*Primary Examiner*—Jill Gray
(74) *Attorney, Agent, or Firm*—Ernest D. Buff & Associates, LLC; Ernest D. Buff; Gordon E. Fish

(57) ABSTRACT

A metallic glass-coated wire is formed by drawing a hollow glass fiber from a container in which molten alloy is entrained and solidified. Interference stresses extant between the glass coating and the alloy core of the wire are produced by systematically controlling thickness and mechanical elastic properties of the glass. The interference stress is tailored by selection of glass thickness and chemistry to optimize wire drawing process conditions, such as drawing temperature and strain rate. In addition, the interference stress is especially tailored to assure physical integrity of the glass-alloy composite wire product. Local property variations along the wire length are minimized, facilitating production of discrete wire segments especially suited for use in EAS applications.

6 Claims, 3 Drawing Sheets

U.S. PATENT DOCUMENTS

2005/0077073 A1* 4/2005 Palacios et al. ............ 174/94 R
2005/0109435 A1* 5/2005 Liebermann et al. ....... 148/561
2005/0158545 A1* 7/2005 Liebermann et al. ....... 428/384

OTHER PUBLICATIONS

Preparation and Characterizatio of Glass-Covered Magnetic Wires. *Materials Science and Engineering A304-306* (2001), p. 166-171.

\* cited by examiner

Initial state of drawn fiber before cooling.

Final state of drawn fiber after cooling.

ENGINEERED GLASSES FOR METALLIC GLASS-COATED WIRE

This application claims the benefit of U.S. Provisional Patent Application No. 60/437,460, filed Jan. 2, 2003, entitled "Engineered Glasses For Metallic Glass-Coated Wire".

BACKGROUND OF THE INVENTION

1. Field of the Invention

This invention relates to metallic wire for electromagnetic applications such as electronic article surveillance (EAS); and more particularly to engineered glasses having in combination transverse geometric dimensions and mechanical properties that collectively impart superior mechanical integrity and magnetic properties to the glass-coated EAS wire.

2. Description of the Prior Art

Fine glass-coated metallic wire has been produced in a single step process without the use of quenching substrates.

A two-staged process as described by Taylor (Phys. Rev. 23, (1924) 655) involves drawing the end of a heated glass tube that contains molten alloy into a 0.5 to 1 mm diameter glass-coated rod having a length of a foot or more. This glass-coated rod is subsequently mechanically drawn through a heated die having holes the size of the final glass-coated wire diameter desired. Cooling rates employed by the Taylor method are much too low for production of metallic wire having an amorphous atomic structure.

U.S. Pat. No. 5,240,066 to Gorynin et al. discloses a method of casting amorphous and nanocrystalline alloy glass-coated wires. One of the problems with glass-coated wire produced by the '066 patent process is the tendency of glass to crack during manufacture or afterwards. The cracking problem is particularly acute when the product is exposed to changing temperatures. Another problem with the product produced by the '066 patent is its limited magnetic properties, for example low signal amplitude in the presence of an applied magnetic field. The restricted magnetic properties make the '066 product a poor candidate for use in EAS applications.

In U.S. Pat. No. 6,270,591 to Chiriac et al. and U.S. Patent Application Publication U.S. 2001/0001397 A1 (the '1397 application), there is disclosed a process as well as a glass-coated wire. The wire core is composed of an amorphous or nanocrystalline metallic alloy. Nowhere in either of these two references is a glass chemistry specified for preferential use in practice. In fact, only in Example 1 of each of these citations is reference made to the use of Pyrex®, which does not signify a specific glass chemistry, but rather a range of glass chemistries. For example, Corning Inc. offers two grades (7740 and 7789) of Pyrex for sale, one being slightly less dense and having slightly lower softening point than the other. Therefore, simply describing the use of Pyrex in glass-coated wire drawing operations is vague. As with the '066 patent, the glass-coated wire produced by Chiriac et al. and '1397 application exhibit limited magnetic response in the presence of an applied magnetic field. Such restricted magnetic properties impose reduced gating distance, limiting tag detection in EAS applications, and can trigger false alarms or fail to alarm during use of the tag in retail anti-theft systems. They also limit performance of the glass-coated wire product in other electromagnetic applications such as inductors, sensors, and transducers.

SUMMARY OF THE INVENTION

The present invention provides a method and means for producing metallic glass-coated wire directly from the melt. Metallic glass-coated wire products produced in accordance with the invention exhibit improved magnetic response in the presence of an applied magnetic field. The high signal amplitude and increased gating distance of these products make them excellent candidates for use in EAS applications.

Generally stated, a metallic glass-coated wire is formed by drawing a hollow glass fiber from a container in which molten alloy is entrained and solidified. Interference stress extant between the glass coating and the alloy core of the wire is achieved by systematically controlling thickness and mechanical elastic properties of the glass. The interference stress is tailored by selection of glass thickness, chemistry and structure to optimize wire drawing process conditions, including drawing temperature and strain rate. In addition the interference stress is especially tailored to assure physical integrity of the glass-alloy composite wire product. Local property variations along the wire length are minimized. Discrete wire segments thereby produced are especially suited for use in EAS applications.

In practice, the method of this invention allows for options in the production of glass-coated metallic wire. Limitations previously governing the selection of magnetic amorphous alloy compositions are mitigated by suitable selection of glass chemistry, microstructure and coating thickness. For magnetic amorphous alloys, a strong stress-induced magnetic directionality (anisotropy) can by induced either along the wire length, or in a plane perpendicular to the wire axis, depending on the selection of amorphous alloy chemistry, glass chemistry, microstructure, and the radial dimensions of the alloy and the glass.

BRIEF DESCRIPTION OF THE DRAWINGS

The invention will be more fully understood and further advantages will become apparent when reference is made to the following detailed description and the accompanying drawings, wherein like reference numerals denote similar elements throughout the several views and in which.

DETAILED DESCRIPTION OF THE INVENTION

Figure 1:
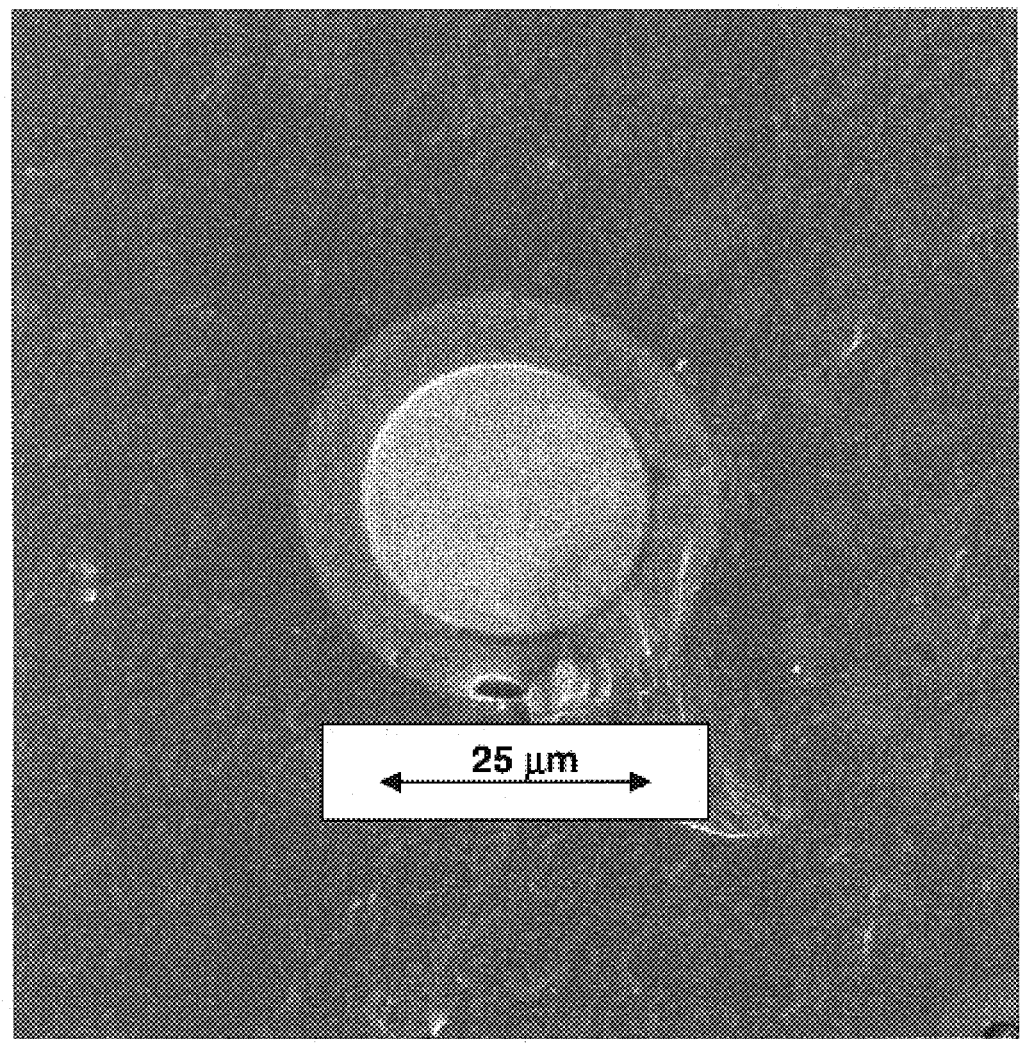
FIG. 1 shows a transverse cross-sectional view of glass-coated wire with an amorphous alloy core having nominal chemistry $Fe_{75}B_{15}Si_{10}$ (light colored circle) surrounded by glass (dark annulus)

As used herein, the term "amorphous metallic alloy" means a metallic alloy that substantially lacks any long-range order and is characterized by x-ray diffraction intensity maxima that are qualitatively similar to those observed for liquids or oxide glasses. In contrast, "nanocrystalline alloy" pertains to those having constituent grain sizes on the order of nanometers.

The term "glass", as used throughout the specification and claims, refers to an inorganic product of fusion that has cooled to the solid state without crystallizing, or to glassy materials formed by chemical means such as a sol-gel process, or by "soot" processes, both of which are used to form glass preforms that are used in fiber optic processing. The latter materials are not fused, but rather are consolidated at high temperatures, generally below the fusion temperatures of the constituents in question.

The term "drawing", as used herein, refers to the extension of a material using a tensile force, said extension resulting in a permanent reduction of materials cross-sectional area.

The term "fiber", as used herein, refers to a thin element, which may be continuous or non-continuous, of circular or non-circular cross-section, and which has a transverse dimension less than about 50 µm.

The term "microwire", as used herein, means a fiber that is present as a single element or as multiple elements, and comprises at least one metallic material. The term "microstructure", as used herein, refers to the atomic arrangements, of a glass or as alloy, on the scale of approximately 10 nm to 10 mm. Glasses and alloys of a single chemical composition can have a wide variety of properties depending on their microstructure. It is possible to control microstructure, and hence properties, by processing variations.

The terms "liquidus temperature" and "liquidus", as used herein, refer to the temperature above which there are no stable crystalline phases in the material.

The term "thermal contraction coefficient", as used herein, refers to the amount of length change of a material per unit length of that material, and per unit temperature, when the materials is cooled from a high temperature to a low temperature.

The terms "annealing temperature" and "annealing point", as used herein, refer to the temperature at which the viscosity of a glass is $10^{12}$ Pa-sec.

The term "strain point", as used herein, refers to the temperature at which the viscosity of a glass is $10^{13.5}$ Pa-sec.

The terms "working temperature" and "working point", as used herein, refer to the temperature at which a glass has a viscosity of $10^3$ Pa-sec.

The term "saturation magnetization", as used herein, refers to the finite level of magnetization attained by a ferromagnetic materials when sufficiently high magnetic fields are applied.

The term "magnetostriction", as used herein refers to the change in dimensions of a magnetic material when subjected to a magnetic field.

The term "anisotropy", as used herein, refers to an energetically preferred direction along which magnetization lies in a magnetic material.

The term "permeability", as used herein refers to the increase of magnetization that occurs when a magnetic material is subjected to an applied magnetic field.

The term "squareness", as used herein, refers to the ratio of remanent magnetization to saturation magnetization.

Stresses can develop between two materials of differing thermal contraction coefficient, as they expand and contract due to temperature excursions. This can lead to dramatic improvements of mechanical integrity and magnetic properties of glass-coated metallic microwire. The magnetic property opportunities arise from the magnetostrictive properties of the amorphous alloy. Problems can arise if the teachings of the present invention are not followed. The physical origin of some problems is related to the large stresses generated in both the metallic core and in the glass coating during the process of fiber formation from a high temperature.

Under slow cooling conditions, stresses typically begin to arise when both the glass and the alloy are cooled through the strain point. However, cooling rates are extremely high in our fiber forming process. A person schooled in the art of glass science would recognize that the temperature at which stresses begin to form are likely much higher, due to the finite time required for the stresses to relax with the time proportional to the viscosity and shear modulus of the materials in question. For present purposes we will assume that the stresses form at the glass annealing temperature ($T_g$).

For simplicity we will also assume that the temperature at which stresses begin to arise are determined by the glass coating.

Figure 2:
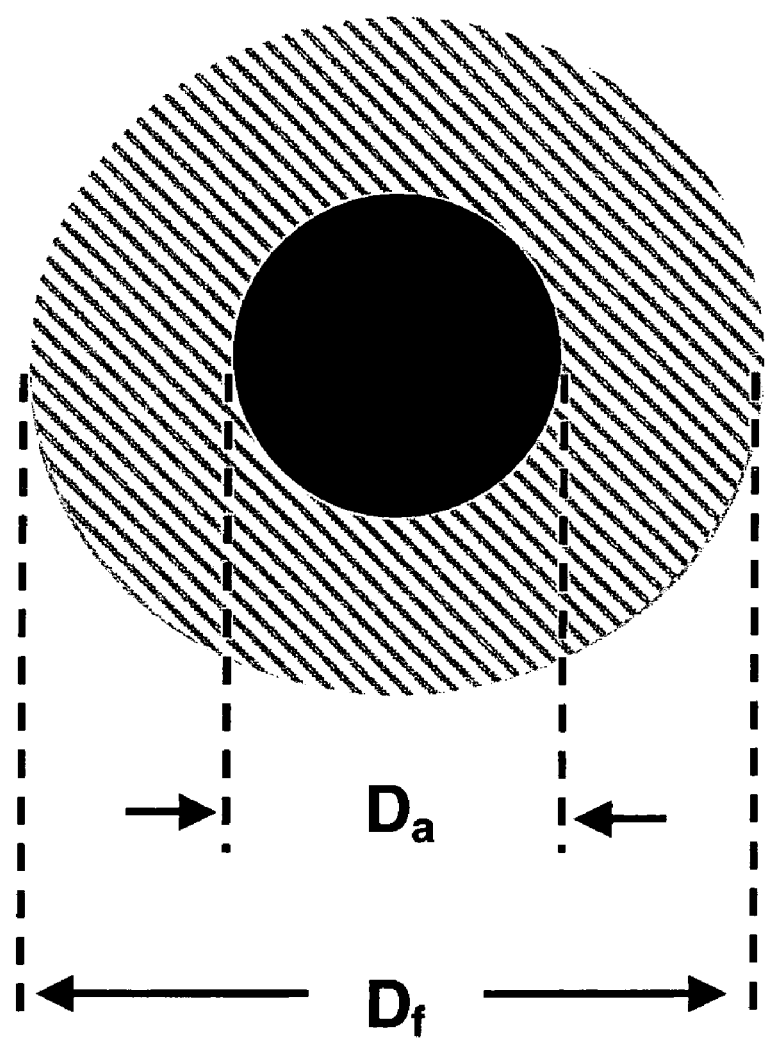
FIG. 2 schematically shows a transverse cross-section of a microwire fiber, including algebraic variables for metallic core and fiber outer diameters.

In FIG. 2 there is shown the cross section of a typical glass-coated amorphous metallic fiber. With this geometry, and assuming that the elastic modulus and Poisson's ratio are equal for the alloy and glass, the stress in the glass is given by $$\sigma_{gl} = \frac{E}{1-\mu}(T_g - T)(\alpha_{gl} - \alpha_a)\frac{A_a}{A_f} \quad (1)$$

wherein the constituent terms are defined as:

| | |
|---|---|
| E | Elastic modulus. |
| µ | Poisson's ratio. |
| T | Temperature. |
| $T_g$ | Glass annealing temperature. |
| $T_f$ | Temperature to which the sample is cooled. |
| $\alpha_{gl}$ | Average linear thermal contraction coefficient of the glass between $T_g$ and T. |
| $\alpha_a$ | Average linear thermal contraction coefficient of the alloy between $T_g$ and T. |
| $A_{gl}$ | Cross-sectional area of the glass cladding. |
| $A_f$ | Total cross-sectional area of the fiber. |

The axial stress in the metallic core is given by $$\sigma_a = \frac{E}{1-\mu}(T_g - T)(\alpha_a - \alpha_{gl})\frac{A_{gl}}{A_f} \quad (2)$$

The cross-sectional areas are $$A_a = \frac{\pi D_a^2}{4} \text{ and } A_{gl} = \frac{\pi(D_f^2 - D_a^2)}{4} \text{ and } A_f = \frac{\pi D_f^2}{4} \quad (3)$$

where $A_a$ is the cross-sectional area of the metallic core.

Table I shows the calculations for various $D_i$ values where $\alpha_{gl}$ is less than $\alpha_a$. The ratio of $D_f/D_a$ is important since, for given E, µ and α values, the thickness of the glass coating relative to the metal core determines the stress in both, through the ratios $A_a/A_f$ and $A_{gl}/A_f$. Values of the thermal contraction coefficient of the metallic alloys are not known precisely; but are assumed to be substantially equivalent to published thermal expansion coefficients.

TABLE I

| PROPERTY | $D_{fiber}$ μm | $D_{alloy}$ μm | $\sigma_{glass}$ Mpa (Compression) | $\sigma_{alloy}$ Mpa (Tension) |
|---|---|---|---|---|
| E = 80 GPa | 20 | 10 | 155 | 233 |
| μ = 0.25 | 20 | 12 | 186 | 198 |
| | 20 | 15 | 233 | 136 |
| $\alpha_{glass}$ = 3 ppm° C$^{-1}$. | 30 | 10 | 103 | 276 |
| $\alpha_{alloy}$ = 8 ppm° C$^{-1}$. | 30 | 20 | 207 | 172 |
| | 30 | 25 | 258 | 95 |
| $T_g$ = 600° C. | 15 | 10 | 207 | 172 |
| T = 20° C. | 15 | 11 | 227 | 143 |
| | 15 | 12 | 248 | 112 |

The alloy core is in tension along the axis of the fiber while the glass is in compression. Having the glass under compression is generally desired due to "delayed failure" phenomena in which cracks grow slowly under tension, leading to eventual failure. The relative thickness of the metallic core and overall fiber controls the magnitude of the stress in each. A small diameter metallic core will produce low stresses in the glass, but will itself having high tensile stresses.

When the thermal contraction coefficients are equal there will be little stress in either the glass or the alloy due to the cooling from the set point. However, as pointed out by U.S. Pat. No. 6,270,591 to Chiriac et al., the alloy will have an additional stress, due to the winding tension of the drawing process. The glass behavior can also be altered by the drawing process such that the effective thermal contraction coefficient is larger than that determined from the thermal contraction behavior of a normal, rapidly cooled glass rod.

When the contraction of the glass is greater than that of the alloy, the stress conditions are reversed. The metallic core will be under axial compression and the glass coating will be under axial tension. As noted, this is generally undesirable since failure of the glass coating can result.

When the contraction coefficient of the alloy is less than that of the glass, the degree of mismatch of the thermal contraction coefficients must be such that the stress in the glass coating is less than about 50 MPa and preferably less than about 20 MPa. Above this value it is possible to have slow crack growth over time, which can eventually cause failure of the glass coating and release of stress, locally in the alloy, such that any beneficial magnetostrictive effect is lost. This is because an enhancement of magnetic properties via magnetostriction is desired. Furthermore, the glass coating will be much more susceptible to surface damage. It will be easier to introduce new flaws, with the same result, of a loss in stress in the interior alloy, and access of the environment to the metallic core through the cracks.

Equation (1) can be rearranged to permit calculation of the allowed thermal contraction mismatch for any give set of conditions.

$$(\alpha_{gl} - \alpha_a) = \frac{(50 \text{ MPa})(1 - \mu)}{E(T_g - T)} \frac{A_f}{A_a} \quad (4)$$

Thus, large overall fiber diameters allow a greater mismatch, as does a small metallic core diameter, for a given fiber diameter.

For the above equations it has been assumed that the modulus and the $T_g$ of the glass and alloy are the same. If the moduli are substantially different, the equations are modified.

Case with Major Differences Between the Glass and Alloy Moduli.

Figure 3:
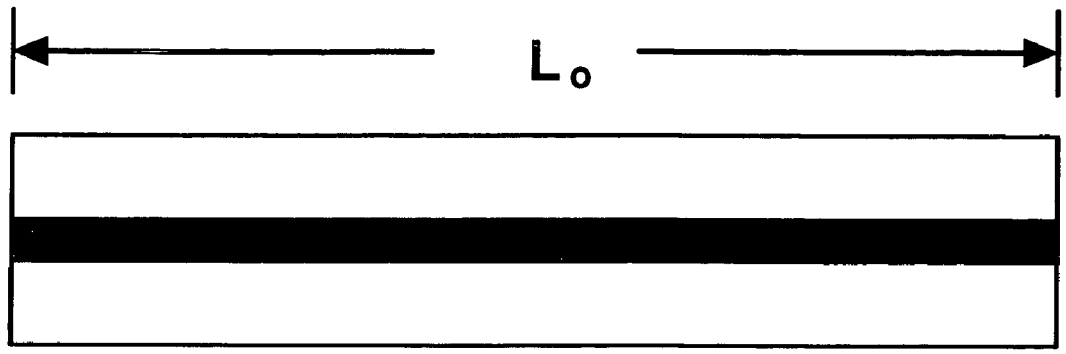
FIG. 3 schematically shows an axial cross-section of a microwire fiber, including the algebraic variable for its length.

Generally, the moduli of the alloy and glass are substantially different. In such cases, a more detailed composite approach is used to calculate the stresses. A side view of the composite is shown in FIG. 3. The axial cross-section of microwire fiber shown by FIG. 3 is in the initial state, prior to cooling of the fiber.

Figure 4:
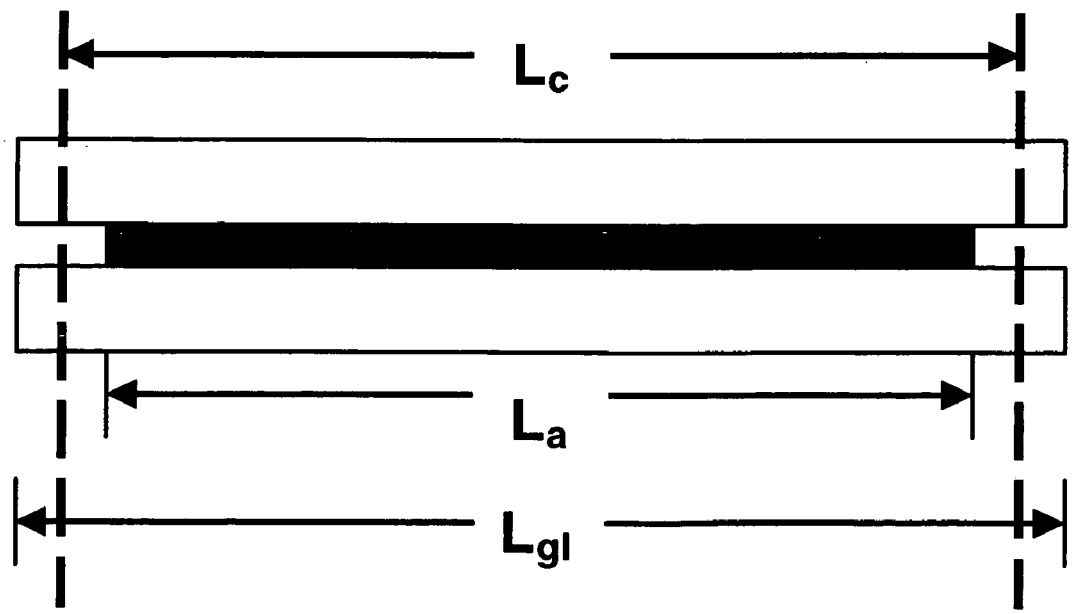
FIG. 4 schematically shows an axial cross-section of a microwire fiber while under the influence of axial interfacial stress between the glass and the metallic core.

In FIG. 4 there is shown an axial cross-section of a microwire fiber while under the influence of axial interfacial stress between its glass and the metallic core components. This condition of the microwire fiber occurs after cooling—assuming that the alloy and glass are not connected. In the microwire fiber shown by FIG. 4, the alloy has a higher contraction coefficient than the glass.

The glass and alloy of the microwire shown by FIG. 4 are bonded. During drawing, the alloy will be pulled out to a length $L_c$, indicated by the dotted vertical line, and the glass will be pulled into compression to $L_c$. It is important that the sum of the absolute values of the change in length of the glass coating and that of the metallic core substantially equal the distance between the glass and alloy shown in FIG. 4. Since that distance is related to the thermal contraction coefficients, and to the difference in temperature between the set-points and room temperature:

$$Abs(\Delta L_{gl} + \Delta L_a) = Abs(L_o \Delta \alpha \Delta T) \quad (5)$$

Where $\Delta \alpha$ is the difference in thermal contraction coefficients of the alloy and glass from the temperature at which stresses begin to form, to room temperature.

Also, if stresses are assumed to be uniform throughout the fiber:

$$\sigma_a A_a = -\sigma_{gl} A_{gl} \quad (6)$$

And further:

$$\sigma_a = \frac{\varepsilon_a E_a}{1 - \mu} \text{ and } \sigma_{gl} = \frac{\varepsilon_{gl} E_{gl}}{1 - \mu} \quad (7)$$

With these approximate conditions it is possible to show that:

$$\varepsilon_a = \varepsilon_{gl} \frac{E_{gl} A_{gl}}{E_a A_a} = K \varepsilon_{gl} \quad (8)$$

where $$\varepsilon_a = \frac{L_c - L_m}{L_m} \text{ and } \varepsilon_{gl} = \frac{L_c - L_{gl}}{L_{gl}} \quad (9)$$

The preceding equations allow calculation of an approximate stress in the metallic core and in the glass, due to the thermal contraction mismatch. Other factors, such as fiberizing temperature, cooling rate, and draw speed tend to influence the axial stress; but the above formulas describe effects of the important material properties and fiber geometry, over which the experimenter or producer has considerable control. Furthermore, the thermal contraction coefficients and the temperature at which stresses begin to form (assumed here to be $T_g$) will also vary with fiberizing temperature, cooling rate, and draw speed.

The values set forth in Table II illustrate the effects of the important material properties and fiber geometry. In each case, there is extant a temperature difference (ΔT) of 600° C. between the annealing point and room temperature. Poisson's ratio is 0.25 for each of the metal and the glass.

TABLE II

| $E_a$ GPa | $E_{gl}$ GPa | $α_a$ ppm °$C^{-1}$. | $α_{gl}$ ppm °$C^{-1}$. | $D_a$ μm | $d_{fib}$ μm | $σ_a$ MPa | $σ_{gl}$ MPa |
|---|---|---|---|---|---|---|---|
| 200 | 80 | 8.0 | 3.0 | 5 | 15 | −610 | 76 |
| 200 | 80 | 8.0 | 3.0 | 5 | 20 | −686 | 46 |
| 200 | 80 | 8.0 | 4.0 | 5 | 20 | −549 | 37 |
| 200 | 80 | 10.0 | 3.0 | 5 | 20 | −960 | 64 |
| 200 | 70 | 8.0 | 3.0 | 10 | 20 | −410 | 137 |
| 150 | 100 | 8.0 | 3.0 | 10 | 15 | −273 | 218 |
| 200 | 70 | 8.0 | 9.0 | 10 | 15 | 49 | −39 |
| 200 | 70 | 8.0 | 10.0 | 10 | 15 | 97 | −78 |
| 200 | 80 | 8.0 | 10.0 | 10 | 15 | 107 | −85 |
| 200 | 80 | 8.0 | 10.0 | 6 | 15 | 217 | −41 |
| 200 | 80 | 8.0 | 10.0 | 10 | 22 | 194 | −50 |

As shown by the data in Table II, each of the parameters has an effect on the resultant stress in the alloy and glass. For a given set of material properties, considerable control over stress is exercised by altering the fiber geometry, specifically the ratio of the metallic core diameter to the overall fiber diameter. Increasing the metallic core diameter decreases the stress in the alloy while increasing stress in the glass.

Of critical importance is the ability to control tensile stress in the glass coating by increasing the overall fiber diameter while holding the metal core diameter constant. This is illustrated by the data set forth at rows 9-11 of Table II. Glass-coated amorphous microwire of the present invention can readily be tailored to be advantageously suited to a number of distinct applications by adjusting alloy and glass chemistry as well as the relative dimensions of the alloy and glass components. Among other benefits, our glass-coated amorphous microwire needs no magnetic field annealing to achieve optimal magnetic properties. This benefit is not readily obtained with conventional amorphous alloy ribbon which, when annealed to enhance magnetic properties such as permeability, squareness and saturation magnetization, encounters substantial degradation of mechanical properties, such as ductility. Exemplary properties of our glass-coated amorphous microwire include remarkably high magnetic permeability and squareness as well as high saturation magnetization. In addition, magnetostriction can readily be adjusted by appropriate selection of amorphous alloy chemistry. In combination, these properties make our glass-coated amorphous wires ideally suited for use in magnetic harmonics-based EAS systems for antipilferage, anti-counterfeiting, authentication and the like. In addition, the encoding of our glass-coated amorphous wire forges a critical link to establishing low-cost systems wherein multi-bit information storage media is read remotely. Applications for these systems comprise inventory control, drivers' licenses, passports, and various other documentation of import, including currency, commercial instruments and the like. The ability to readily obtain selected amorphous alloy magnetostriction values makes our amorphous glass-coated wire desirable for use in sensor and transducer applications. For example, the use of amorphous glass-coated wire in selected bandaging allows the remote detection and quantification of wound healing.

Applications for use of our glass-coated microwire further include its incorporation into or onto textiles, yarn, ribbon, thread and virtually any fabric for purposes of tracking garments and clothing associated therewith. Also included in potential applications are such paper products as cardboard, paper laminations, paper composites and packaging supplies assembled and manufactured with paper based materials. Further applications of our microwire include use in or on composites comprised of plastics and resin based materials. Applications within living subjects, including humans and animals, for tracking as well as for biomedical purposes, such as monitoring stent condition during residence in the body, are readily accomplished. Use of our microwire is also found in electronics for micro miniature connectors, magnetic inductors, coaxial cabling, and for carrying electrical power. Finally, microwire of the present invention is especially suited for use in pulse power applications, high frequency motors, RFI and EMI shielding, magnetic resonance imaging, thermostats, pressure gauges, stress loading devices and the like.

The following examples are presented to provide a more complete understanding of the invention. The specific techniques, conditions, materials, proportions and reported data set forth to illustrate the principles and practice of the invention are exemplary and should not be construed as limiting the scope of the invention.

EXAMPLE 1

An ingot composed of an amorphous-forming alloy is prepared by loading the appropriate weights of constituent elements into a quartz tube that is sealed at one end. The other end of this quartz tube is connected to a pressure-vacuum system to allow evacuation and back-filling with Ar gas several times to ensure a low oxygen Ar atmosphere within the quartz tube. Next, the closed end of the quartz tube in which the elements reside is introduced into a high frequency induction heating coil. With the application of radio frequency ("r.f.") power, the elements inside the tube are caused to heat and melt into a stirred, homogeneous alloy body. When the r.f. power is shut off, the alloy body is allowed to cool to room temperature in the Ar atmosphere. Once cooled, the same alloy body is inserted into the bottom of a vertically disposed glass tube, having 6 mm diameter, that is sealed at the lower end. The upper end of this glass tube is connected to a pressure-vacuum system to allow evacuation and back-filling with Ar gas several times to ensure a low oxygen Ar atmosphere within the quartz tube. A specially-built inductor at the bottom of the glass tube is energized with r.f. power in order to heat and then melt the alloy body within the tube. Once the alloy body is molten and overheated by some 20 to 50° C., a solid glass rod is used to touch and bond to the bottom of the sealed glass tube in which the molten alloy resides. The heat of the molten alloy having softened the glass tube, allows is to be drawn by pulling on the glass rod to which it is attached. Molten alloy is entrained in the drawn glass capillary that results. The drawn capillary is then pulled and guided onto a spinning take-up spool, which provides both winding tension to ensure continuous drawing at a rate of about 5 meters/second and a systematic alloy wound package.

Amorphous glass-coated wire is produced using the procedure described above. The microwire has an $Fe_{77.5}B_{15}Si_{7.5}$ amorphous alloy core that is under axial tensile stress. Glass coating the microwire is a low-expansion borosilicate having an approximate composition set forth below:

| Constituent | Weight % |
|---|---|

-continued

| | |
|---|---|
| SiO$_2$ | 80 |
| B$_2$O$_3$ | 13 |
| Al$_2$O$_3$ | 3 |
| Na$_2$O | 4 |
| Working Point | 1,256° C. |
| Assumed set point = Annealing Point = | 565° C. |
| | (depends on cooling rate) |
| Elastic Modulus | 80 GPa |
| $\alpha_{gl}$ (Annealing pt. - 25° C.) | 3.5 ppm ° C$^{-1}$. |

The metallic alloy used to form the microwire has the following properties:

| | |
|---|---|
| Liquidus | 1,230° C. |
| Elastic Modulus | 200 GPa |
| $\alpha_a$ | 8.0 ppm ° C$^{-1}$. |

The working point of the glass is slightly higher than the liquidus temperature of the alloy, but within limits that allow easy fiber formation.

TABLE III

Stresses in the metallic core and glass coating as a function of the fiber geometry.

| | $E_a$ GPa | $E_{gl}$ GPa | $\alpha_a$ ppm ° C$^{-1}$. | $\alpha_{gl}$ ppm ° C$^{-1}$. | $d_a$ μm | $d_{fib}$ μm | $\sigma_a$ MPa | $\sigma_{gl}$ MPa |
|---|---|---|---|---|---|---|---|---|
| 1 | 200 | 80 | 8.0 | 3.5 | 5.0 | 15.0 | −549 | 69 |
| 2 | 200 | 80 | 8.0 | 3.5 | 5.0 | 20.0 | −617 | 41 |
| 3 | 200 | 80 | 8.0 | 3.5 | 5.0 | 25.0 | −652 | 27 |

EXAMPLE 2

Amorphous glass-coated wire is prepared by the procedure described in Example 1. The microwire has an Fe$_{77.5}$B$_{15}$Si$_{7.5}$ amorphous alloy core that is under tensile stress. It has a glass coating consisting essentially of a medium expansion alkali borosilicate having an approximate composition:

| Constituent | Weight % |
|---|---|
| SiO$_2$ | 72 |
| B$_2$O$_3$ | 12 |
| Al$_2$O$_3$ | 7 |
| Na$_2$O | 6 |
| K$_2$O | 2 |
| CaO | 1 |
| Working Point | 1140° C. |
| Annealing Pt. | 570° C. |
| Elastic Modulus | 80 GPa |
| $\alpha_{gl}$ (Annealing pt. - 25° C.) | 7.0 ppm ° C$^{-1}$. |

The working point of this glass is at the low end of allowed temperatures since the liquidus temperature of the alloy is 1,230° C.

TABLE IV

Stresses in the metallic core and glass coating as a function of the fiber geometry.

| | $E_a$ GPa | $E_{gl}$ GPa | $\alpha_a$ ppm ° C$^{-1}$. | $\alpha_{gl}$ ppm ° C$^{-1}$. | $d_a$ μm | $d_{fib}$ μm | $\sigma_a$ MPa | $\sigma_{gl}$ MPa |
|---|---|---|---|---|---|---|---|---|
| 4 | 200 | 80 | 8.0 | 7.0 | 5.0 | 25.0 | −145 | 6 |
| 5 | 200 | 80 | 8.0 | 7.0 | 5.0 | 20.0 | −137 | 9 |
| 6 | 200 | 80 | 8.0 | 7.0 | 10.0 | 15.0 | −53 | 43 |

In this example the metallic core stress is small and can approach zero as the fiber diameter decreases while holding the metal diameter constant, or simultaneously.

EXAMPLE 3

Amorphous glass-coated wire is prepared using the procedure described in Example 1. The microwire has a Co$_{66}$Fe$_4$Ni$_1$B$_{14}$Si$_{15}$ amorphous alloy core that is under low stress, since this alloy has nearly zero magnetostriction. Components of the glass-coated wire are described below:

Glass

Soda-lime silicate container glass—approximate composition:

| Constituent | Weight % |
|---|---|
| SiO$_2$ | 72 |
| B$_2$O$_3$ | — |
| Al$_2$O$_3$ | 1 |
| Na$_2$O | 14 |
| K$_2$O | — |
| CaO | 10 |
| MgO | 3 |
| Working Pt. | 1,035° C. |
| Annealing Pt. | 560° C. |
| Elastic Modulus | 70 GPa |
| $\alpha$(Annealing pt. - 25° C. ) | 10.3 ppm ° C$^{-1}$. |

Alloy

| | |
|---|---|
| Liquidus | 1,080° C. |
| E | 100 GPa |
| $\alpha_a$ | 12.7 ppm ° C$^{-1}$. |

Soda-lime silicate glass works well for this alloy as it has a lower working range, consistent with the low liquidus temperature of Co$_{66}$Fe$_4$Ni$_1$B$_{14}$Si$_{15}$. Furthermore, the thermal contraction coefficient more closely matches that of the alloy.

TABLE V

Stresses in the metallic core and glass coating as a function of the fiber geometry.

| | $E_a$ GPa | $E_{gl}$ GPa | $\alpha_a$ ppm ° C$^{-1}$. | $\alpha_{gl}$ ppm ° C$^{-1}$. | $d_a$ μm | $d_{fib}$ μm | $\sigma_a$ MPa | $\sigma_{gl}$ MPa |
|---|---|---|---|---|---|---|---|---|
| 7 | 100 | 70 | 12.7 | 10.3 | 15.0 | 20.0 | −68 | 87 |
| 8 | 100 | 70 | 12.7 | 10.3 | 10.0 | 20.0 | −130 | 43 |
| 9 | 100 | 70 | 12.7 | 10.3 | 10.0 | 15.0 | −90 | 72 |

EXAMPLE 4

Amorphous glass-coated wire is prepared using the procedure described in Example 1. The microwire has an $Fe_{81}B_{13.5}Si_{3.5}C_2$ amorphous alloy core. Axial compressive stresses resulting in this example cause the microwire not to function magnetically. Its glass and metallic alloy components described below:

Glass

Medium expansion alkali borosilicate—same glass as in Example 2.

| | |
|---|---|
| Working Point | 1140° C. |
| Annealing Pt. | 570° C. |
| Elastic modulus | 80 GPa |
| $\alpha_{gl}$ (Annealing pt. - 25° C.) | 7.0 ppm ° $C^{-1}$. |

Alloy

| | |
|---|---|
| Liquidus | 1,171° C. |
| $\alpha_a$ | 5.6 ppm ° $C^{-1}$ |
| Elastic modulus | 100 GPa |

The quoted thermal contraction coefficient between room temperature and 300° C. is 5.5 ppm ° $C^{-1}$. This would produce a compressive stress in the alloy core. However, using the thermal contraction coefficient between the annealing point and room temperature results in a tensile stress. The glass is also in tension under these conditions.

TABLE VI

Stresses in the metallic core and glass coating as a function of the fiber geometry.

| $E_a$ GPa | $E_{gl}$ GPa | $\alpha_a$ ppm ° $C^{-1}$. | $\alpha_{gl}$ ppm ° $C^{-1}$. | $d_a$ μm | $d_{fib}$ μm | $\sigma_a$ MPa | $\sigma_{gl}$ MPa |
|---|---|---|---|---|---|---|---|
| 10 | 100 | 80 | 5.60 | 7.00 | 10.0 | 15.0 | 56 | −45 |
| 11 | 100 | 80 | 5.60 | 7.00 | 5.0 | 15.0 | 97 | −12 |
| 12 | 100 | 80 | 5.60 | 7.00 | 10.0 | 20.0 | 79 | −26 |

EXAMPLE 5

Amorphous glass-coated wire is prepared using the procedure described in Example 1. The microwire has an $Fe_{77.5}B_{15}Si_{7.5}$ amorphous alloy core that is under increased axial tensile stress by use of a non-commercial, low contraction glass coating. Component parts of the glass-coated wire are described below:

Glass

Partially leached low expansion alkali borosilicate glass of Example 1. The glass is treated to reduce the amount of alkali and boron oxide, using techniques well known to a person schooled in the art of glass science, yielding a preform with lower thermal contraction coefficient and higher annealing temperature.

| | |
|---|---|
| Working Point (Estimate) | 1,300° C. |
| Annealing Point | 600° C. |
| Elastic Modulus | 80 GPa |
| $\alpha_{gl}$ (Annealing pt. - 25° C.) | 2.5 ppm ° $C^{-1}$. |

Alloy

| | |
|---|---|
| Liquidus | 1,230° C. |
| Elastic Modulus | 200 GPa |
| $\alpha_a$ | 8.0 ppm ° $C^{-1}$. |

TABLE VII

Stresses in the metallic core and glass coating as a function of the fiber geometry.

| | GPa | GPa | ppm ° $C^{-1}$. | ppm ° $C^{-1}$. | μm | μm | MPa | MPa |
|---|---|---|---|---|---|---|---|---|
| 13 | 200 | 80 | 8.0 | 2.5 | 5.0 | 15 | −670 | 84 |
| 14 | 200 | 80 | 8.0 | 2.5 | 5.0 | 20 | −754 | 50 |
| 15 | 200 | 80 | 8.0 | 2.5 | 5.0 | 30 | −821 | 23 |

In this example the stresses in the metallic core are increased over those generated by either a Pyrex® or unmodified KG-33 glass. This results in improved magnetic properties of the magnetostrictive alloy core.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A glass-coated metallic wire wherein said metallic wire is formed from a molten metallic alloy, has an amorphous structure, is magnetic, and has a near-zero saturation magnetostriction, and said glass has a thermal contraction coefficient that is less than and within 3 ppm ° $C^{-1}$ of that of said metallic wire, said thermal contraction coefficient value being such that said glass is under residual compression, interfacial bonding between said glass and said wire is substantially uniform, and surface cracking and bond breaks between metal and glass are substantially prevented.

2. A glass-coated amorphous metallic wire as recited by claim 1 having an elastic modulus greater than 60 GPa.

3. A glass-coated amorphous metallic wire as recited by claim 1 having an elastic modulus greater than 75 GPa.

4. A glass-coated metallic wire as recited by claim 1, wherein said metallic wire has a composition given by the formula $Co_{66}Fe_4Ni_1B_{14}Si_{15}$.

5. A glass-coated metallic wire as recited by claim 1, wherein said glass is a soda-lime silicate container glass.

6. A glass-coated metallic wire as recited by claim 4, wherein said glass is a soda-lime silicate container glass.

* * * * *